United States Patent
Adam

(10) Patent No.: US 9,971,881 B1
(45) Date of Patent: May 15, 2018

(54) LICENSE-BASED ACCESS CONTROL OF COMPUTING RESOURCES

(71) Applicant: Flexera Software LLC, Itasca, IL (US)

(72) Inventor: Timothy M. Adam, Northcote (AU)

(73) Assignee: Flexera Software LLC, Itasca, IL (US)

( * ) Notice: Subject to any disclaimer, the term of this patent is extended or adjusted under 35 U.S.C. 154(b) by 0 days. days.

(21) Appl. No.: 15/584,768

(22) Filed: May 2, 2017

(51) Int. Cl.
*G06F 21/10* (2013.01)
*H04L 29/06* (2006.01)
*G06F 21/60* (2013.01)
*G06F 21/62* (2013.01)

(52) U.S. Cl.
CPC .......... *G06F 21/105* (2013.01); *G06F 21/604* (2013.01); *G06F 21/6218* (2013.01); *H04L 63/0807* (2013.01); *H04L 63/10* (2013.01); *H04L 2463/101* (2013.01)

(58) Field of Classification Search
CPC .................................................. G06F 21/105
See application file for complete search history.

(56) References Cited

U.S. PATENT DOCUMENTS

| | | | | |
|---|---|---|---|---|
| 6,938,027 B1 * | 8/2005 | Barritz | ............... | G06Q 10/00 706/50 |
| 9,311,139 B1 * | 4/2016 | Lowery | ............... | G06F 9/4843 |
| 2006/0015466 A1 * | 1/2006 | Noioso | ............... | G06F 21/10 705/59 |
| 2008/0306786 A1 * | 12/2008 | Lonowski | ............ | G06Q 10/063 705/7.11 |
| 2010/0268661 A1 * | 10/2010 | Levy | ...................... | G06Q 30/02 705/347 |
| 2014/0343997 A1 * | 11/2014 | Brown | ............ | G06Q 10/06312 705/7.22 |

* cited by examiner

*Primary Examiner* — William Powers
(74) *Attorney, Agent, or Firm* — Michael A. Glenn; Perkins Coie LLP

(57) ABSTRACT

The disclosure is directed to an access permission system that manages provisioning of access to an electronic resource through various types of access permissions. The access permission system provisions access by provisioning a license entitlement of a specified type. A provisioning optimization technique determines a combination of different types of license entitlements to be provisioned according to an optimization criterion associated with an attribute of a license entitlement. For example, the optimization criterion can based on a "unit cost" associated with a license entitlement, and the provisioning optimization technique can determine various types of license entitlements to be obtained (and therefore to be provisioned) in order to minimize a total cost of the license incurred in satisfying the consumption demand requests.

30 Claims, 8 Drawing Sheets

LICENSE-BASED ACCESS CONTROL OF COMPUTING RESOURCES

BACKGROUND

Organizations acquire the right to use electronic resources (e.g., software or hardware functions) through a complex set of electronically-enforceable agreements that provide specific terms under which the electronic resources may be used. Each agreement can grant rights to an entity account or a device to access one or more electronic resources under one or more electronically-enforceable constraints (e.g., according to the terms). A resource control system can examine and enforce these rights. For example, the electronically-enforceable agreement can be referred to as a "license." The resource control system can also include a distribution system. The distribution system can account for consumption of individual rights (e.g., "entitlements") to one or more electronic resources. A license entitlement is a consumable representation of a key that provides access (e.g., with electronically-enforceable constraints) to an electronic resource or a set of electronic resources. The license entitlement can be "consumed" by per usage, per account, per device, per time period, or any combination thereof. When the parties (e.g., an end-user device and the distribution system) commit to the grant of an entitlement, the end-user device is said to have "consumed" the license entitlement. This can be referred to as a license consumption event. It should be noted that some agreements may or may not be electronically enforceable, and license entitlements may or may not be enforced before a resource is permitted to be used. Compliance with an agreement can be evaluated after the fact, for example during an audit, based on electronic records of usage of the resources by entities and/or devices (license consumption events).

It is common for each license consumption event to have more than one potential license entitlement, e.g., license type, that may grant the requested rights of a consumption demand request. For example, access to a software application can be provisioned using an instance-based license that allows any entity to access a specified instance of the software application, that is, an instance of the software application executing on a specified computer. In another example, the access can be provisioned using user-based license that allows a specified user to access any instance of the software application, that is, any instance of software application executing on any of the computers. Various such license types can be provisioned. Further, the associated cost of each license type can be different. Also, an agreement may be flexible as to specific numbers of license entitlements of various types. The organization is liable for license entitlements actually consumed over a period of time, and the organization is free to choose the combination of license entitlements across various types (e.g., to minimize cost) as long as this combination is sufficient to cover all the recorded license consumption events.

In a typical organization, a combination of such license types may be provisioned. When this ambiguity (e.g., having multiple possible variations of license entitlements to consume) exists, enterprises (e.g., potential consumers of the license entitlements) generally desire to obtain the most cost effective entitlement to accomplish the desired task associated with the desired electronic resource. This can serve to minimize the cost of utilizing the electronic resource. For example, the organization may want to determine how many instance-based license types and user-based license types (and for which users) are to be obtained to satisfy the demand in a most cost-effective way. Due to the large number of possibilities across usage constraint types and due to frequent changes to terms of electronically-enforceable agreements, resource versions, resource variations, resource editions, agreement editions, resource consumption patterns, or any combination thereof, it is often impractical for any organization or person to conduct such an optimization exercise in a reasonable amount of time. This challenge is further exacerbated by variance in usage channels (e.g., usage of resources from physical installations, remote usage with technologies such as application or desktop virtualizations, global usage rights, etc.). A typical distribution system may need to process millions of consumption demand requests and grant just as many entitlements within a short period of time. Accordingly, conventional distribution systems are unable to optimize its assignments of license entitlement in an effective manner.

SUMMARY

Embodiments are directed to an access permission system that manages provisioning of access to an electronic resource, e.g., an application executing at a computer server device ("server"), through various types of access permissions. The access permission system can be a license provisioning system that provisions access to instances of the application by assigning an access permission of a specified type to an access request. A provisioning optimization technique determines different types of access permissions to be provisioned to satisfy the access requests while also satisfying an optimization criterion associated with an attribute of an access permission. For example, the optimization criterion can be based on the "unit cost" attribute associated with an access permission, and the provisioning optimization technique can determine various types of access permissions to be obtained (and therefore to be provisioned) in order to minimize a total cost of the license incurred in satisfying the access requests.

The provisioning optimization technique recommends an optimum combination of the different types of access permissions to be procured (e.g., to minimize the total cost of the license incurred in satisfying the access requests) by generating one or more lists. The provisioning optimization technique generates a first list that includes a list of instances of the application to be provisioned using a first type of access permission, and generates a second list of users who are to be provided access to the instances using a second type of access permission. The first type of access permission enables an instance of the application provisioned using the first type of access permission to be accessed by any of the users. The second type of access permission enables a user assigned with the second type of access permission to access any of the instances of the application.

DETAILED DESCRIPTION

Figure 1:
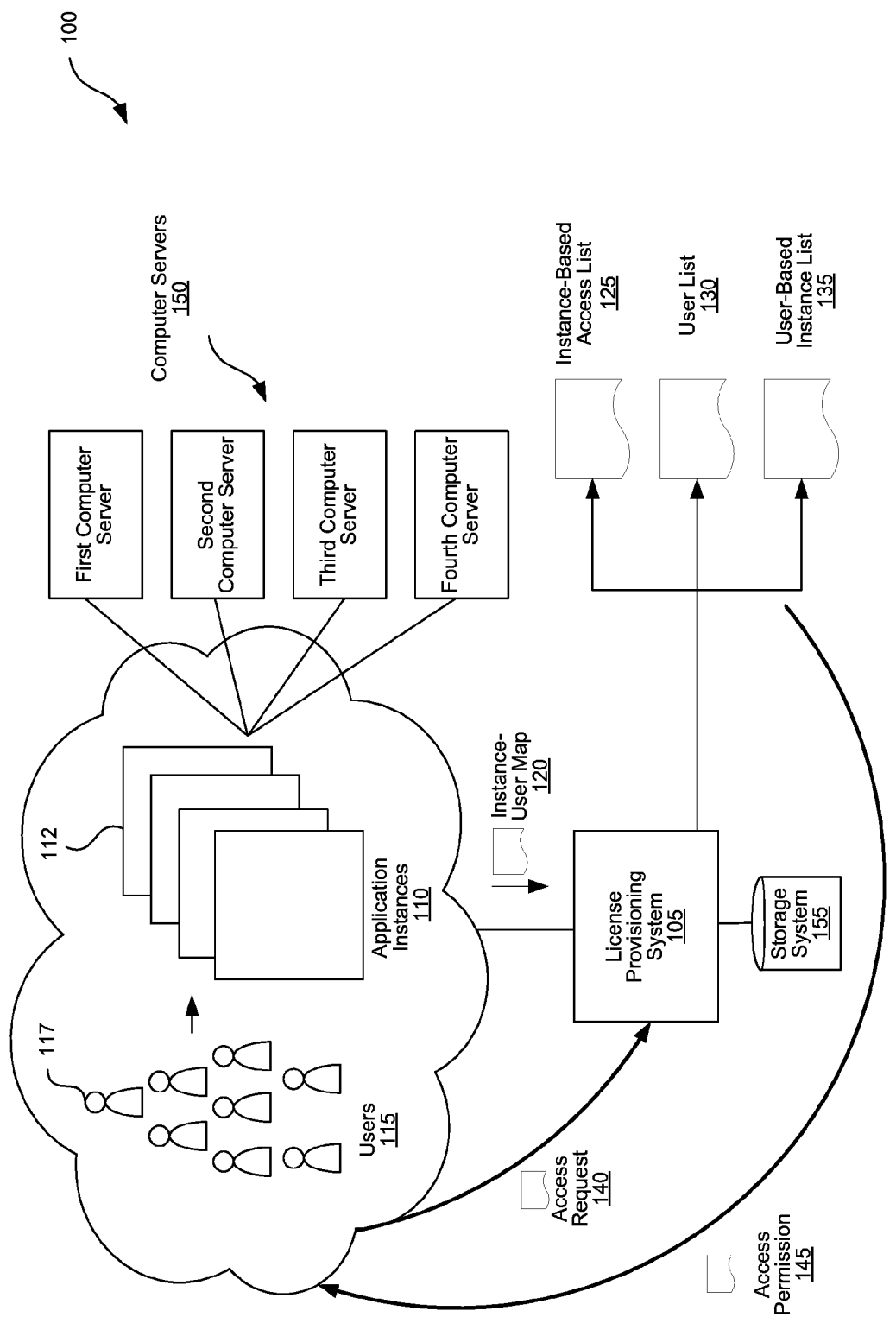
FIG. 1 is a block diagram illustrating an environment in which the disclosed embodiments can be implemented.

The terms used in this disclosure are used in accordance with the following description. A "license entitlement" (LE) or an access permission refers to a data object representing a right granted by a license. The license entitlement can have an available quantity. The available quantity limits how many times the license entitlement can be consumed. An organization can acquire a license entitlement a number of times from an access permission system or a license provisioning system (e.g., a software publisher or an application service platform) and reduce the available quantity of the license entitlement by that number of times. In various embodiments, acquisition of a license entitlement requires relinquishment of a consideration in exchange. The exchange of consideration can be tracked, authenticated, and verified electronically. Each license entitlement contains one or more attribute/value pairs. For example, some of the attribute/value pairs can correspond to a "license metric," "unit cost," one or more "product use rights," or any combination thereof. The license provisioning system can assign a license entitlement to an entity that triggered a consumption demand request for accessing an electronic resource. An electronic resource can be a software application ("application"), and multiple instances of the application can be executing at one or more computer server devices ("servers") in a distributed computing system.

An assignment of the license entitlement to the consumption demand request can be equivalent to the consumption of the license entitlement by the consumption demand request and/or the entity for accessing the electronic resource.

An entity that triggers a consumption demand request and/or consumes the license entitlement to access the electronic resource can be a user of the electronic resource, a computer device associated with the user, or both. In some embodiments, an entity is a user of the electronic resource. The entity can be represented using any unique identification information that distinguishes one entity from the other. For example, the entity can be represented using user identifying information, such as user identification (ID), email, etc. In another example, the entity can be represented using device identifying information, such as device ID, Internet Protocol (IP) address, etc. In yet another example, the entity can be represented using a combination of user and device identifying information. Note that the terms user and entity are used interchangeably in the following paragraphs. However, it should be noted that a user is one example of an entity.

A "license metric" is a categorization of how to measure a license entitlement. When combined with the product use rights, the license metric can provide the complete method for calculating license consumption for a particular license entitlement. A license metric can also be referred to as a "license model." "Unit cost" is the cost of a single unit quantity of a license entitlement. The unit cost can be measured in any quantity metric of considerations (e.g., resources, such as some quantity of an electronic resource) that is spent in exchange for a license entitlement. A "product use right" is an attribute/value pair in a license entitlement that represents a specific term of use granted by the license entitlement. Product use rights, for example, can include allowances to deploy a number of additional instances of software on virtual machines hosted by a licensed device or allowances to deploy a number of backup or disaster recovery installations bundled with a production license entitlement.

A "license consumption event" is an individual instance of license consumption corresponding to a license entitlement that can consume a specific quantity or the entirety of the license entitlement. The license consumption event can be governed and determined by a license metric and corresponding product use rights. The license entitlement can be of different types. For example, an instance-based license entitlement allows a specified instance of an application, e.g., an instance of the application executing on a specified server to be accessed by any entity, e.g., a user of the application. In another example, an entity-based license allows a specified entity that is provisioned with the entity-based license to access any of a number of instances in the distributed computing system. In yet another example, a record license entitlement may be consumed based on records found in a database table that is used by or accessed by licensed software.

A "consumption demand request" is a precursor to a license consumption event. An entity's attempt to utilize an electronic resource can cause the license provisioning system to receive a consumption demand request. Once the license provisioning system confirms which type of license entitlement is assigned to the consumption demand request, the license provisioning system can record this act of consumption as a license consumption event.

Embodiments are directed to an access permission system that manages provisioning of access to an electronic resource through various types of access permissions. In some embodiments, the access permission system is a license provisioning system that provisions access to an electronic resource by assigning a license entitlement of a specified type to the access request. The license provisioning system can implement a provisioning optimization technique that determines different types of license entitlements to be provisioned to satisfy the consumption demand requests while also satisfying an optimization criterion associated with an attribute of a license entitlement. For example, the optimization criterion can be based on the "unit cost" attribute associated with a license entitlement, and the provisioning optimization technique can determine various types of license entitlements to be obtained (and therefore to be provisioned) in order to minimize a total cost of the license incurred in satisfying the consumption demand requests.

To access an instance of the application, the license provisioning system can provision different types of license entitlements, e.g., an instance-based license entitlement and an entity-based license entitlement. In some embodiments, the instance-based license entitlement allows a specified instance of the application, e.g., an instance of the application executing on a specified server to be accessed by any entity, e.g., a user of the application. However, such an access is restricted to only the specified instance. That is, using the instance-based license entitlement, an entity can access only that instance which is provisioned using the instance-based license entitlement and no other instances. In some embodiments, the entity-based license entitlement allows a specified entity that is provisioned with the entity-based license entitlement to access any of a number of instances in the distributed computing system; the specified entity is not restricted to any one specific instance of the application. Note that one or more instances of the application can be executed on a server.

In some embodiments, different types of license entitlements are associated with different unit costs. In a typical organization, some entities are provided access to an application using a first type of access permission, e.g., instance-based license entitlement, and some entities are provided access to the application using a second type of access permission, e.g., user-based license entitlement. The provisioning optimization technique can determine a combination of the license entitlement types to be assigned to the consumption demand requests such that a total cost incurred in obtaining the licenses for satisfying the consumption demand requests is minimized. In some embodiments, the combination of license entitlement types determined using the provisioning optimization technique can incur the least possible cost in satisfying the consumption demand requests of the organization. The provisioning optimization technique can consider as input parameters unit costs of different types of license entitlements and an instance-entity map that indicates a list of entities using each of one or more of the instances in the distributed computing system. The provisioning optimization technique can generate as output (a) an instance-based access list that includes instances that can be provisioned using the instance-based license entitlement, (b) an entity list that includes users to be assigned with user-based license entitlement, and (c) an entity-based instance list including a list of instances which can be used for provisioned to entities from the entity list.

Note that while the foregoing paragraphs describe the provisioning optimization technique being used to minimize a total cost of the license incurred in satisfying the consumption demand requests, the provisioning optimization technique is not restricted to optimizing, e.g., minimizing, the cost, the optimization criterion of the provisioning optimization technique can be configured to optimize various other attributes of a license entitlement.

Turning now to Figures, FIG. 1 is a block diagram illustrating an environment 100 in which the disclosed embodiments can be implemented. The environment 100 includes a license provisioning system 105 that assigns license entitlements to consumption demand requests by entities for accessing an electronic resource. For example, the license provisioning system 105 assigns a license entitlement 145 to an access request 140 by one of the users 115 for accessing one of multiple instances 110 of an application. In some embodiments, the application instances 110 are executing at multiple servers 150. A user can access the instances using a computing device, such as a desktop, laptop, a smartphone, a tablet etc. The license provisioning system 105 controls access to the application instances 110 through the provisioning of license entitlements. A first user 117 is permitted to access an application instance 112 only if the license provisioning system 105 assigns a license entitlement 145 to the access request 140 from the first user 117. The license provisioning system 105 can store the license entitlements in a storage system 155 associated with the license provisioning system 105. The license entitlements stored in the storage system 155 can be of different types, e.g., an instance-based license entitlement and a user-based license entitlement. In some embodiments, the license provisioning system 105 can determine the number of license entitlements to be stored and the type of the license entitlements to be stored based on the lists 125-135.

Further, in some embodiments, the license entitlement type to be assigned to the access requests is also determined based on the lists 125-135.

An instance-based access list 125 includes a list of instances that are to be provisioned using instance-based license entitlements. That is, an instance from the instance-based access list 125 can be accessed any of the users 115 using the instance-based license entitlement. A user list 130 includes a list of users who are to be assigned user-based license entitlements. That is, a user from the user list 130 can access any of the application instances 110 using the user-based license entitlement. Note that the user-based license entitlement is similar to the entity-based license entitlement described above. A user-based instance list 135 includes a list of instances that are to be provisioned to users from the user list 130. In other words, the instances from the user-based instance list 135 are not covered under instance-based license entitlements. It is typically more cost-effective, e.g., the total cost incurred in obtaining the licenses for satisfying the access request is minimized, when the instances from the user-based instance list 135 are provisioned to users with user-based license entitlements. Similarly, while instances from the instance-based access list 125 can be provisioned to any of the users 115, it is typically more cost-effective when they are provisioned to users without user-based license entitlements, that is, to users who are not in the user list 130.

The license provisioning system 105 determines the lists 125-135 using a provisioning optimization technique. The provisioning optimization technique determines the license entitlement types and/or a number of one or more license entitlement types required to satisfy the consumption demand requests such that the assignment satisfies an optimization criterion. The optimization criterion can be associated with an attribute of a license entitlement, e.g., unit cost of a license entitlement. In some embodiments, the optimization criterion is based on a total cost incurred in obtaining the licenses for satisfying the consumption demand requests. The provisioning optimization technique can determine the license entitlement types and/or a number of one or more of the license entitlement types such that a total cost incurred in obtaining the licenses for satisfying the consumption demand requests is minimized, e.g., the combination of license types to be assigned incurs the least possible cost in satisfying the given consumption demand request.

The input parameters for the provisioning optimization technique can include unit costs of different types of license entitlements and an instance-user map 120 that indicates a list of users accessing each of the application instances 110. The provisioning optimization technique can then determine based on the instances, the number of users, the users mapped to the instances, a combination of the license entitlement types that satisfies the optimization criterion. After the combination is determined, that is, after the lists 125-135 are generated, the license entitlements can be procured based on the lists 125-135, e.g., from a computer server (not illustrated) associated with a license vendor for the application, and stored in the storage system 155. When a consumption demand request is received, the license provisioning system 105 can assign a specified license entitlement to the consumption demand request based on the generated lists. For example, when an access request 140 is received from a first user 117, if the first user 117 is from the user list 130, that is, a user who is assigned a user-based license entitlement, the license provisioning system 105 can assign the access request 140 to one of the instances from the user-based instance list 135. If the first user 117 is not in the user list 130, the license provisioning system 105 can provision one of the instances from the instance-based access list 125 to the access request 140.

Figure 2:
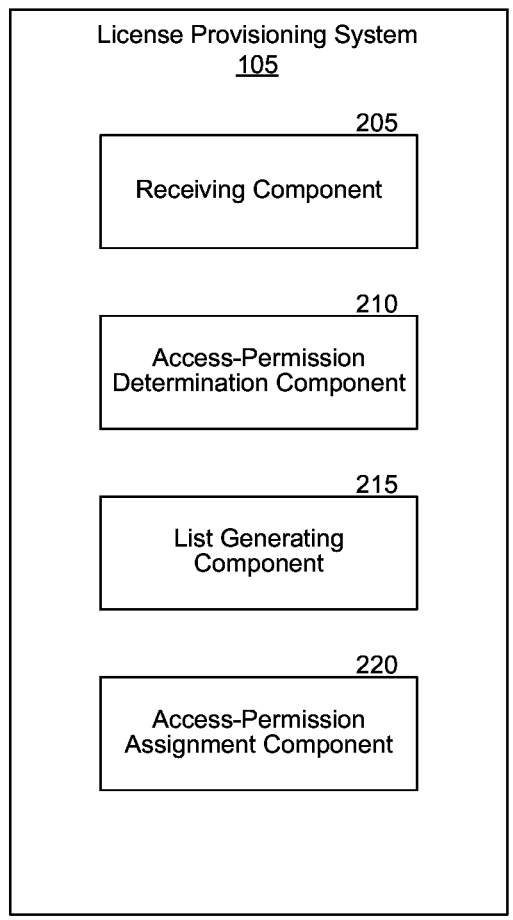
FIG. 2 is a block diagram of a license provisioning system of FIG. 1, consistent with various embodiments.

FIG. 2 is a block diagram of the license provisioning system 105 of FIG. 1, consistent with various embodiments. The license provisioning system 105 includes a receiving component 205 that can receive input parameters for determining the combination of license entitlement types. An input parameter can include one or more of (a) optimization criterion such as unit costs of different types of license entitlements, (b) an instance-user map 120 that indicates a list of users accessing each of the application instances 110, (c) total number of users, (d) total number of instances, etc.

The license provisioning system 105 includes an access-permission determination component 210 that can determine the combination of license entitlement types to be obtained and/or assigned to serve the consumption demand requests while satisfying the optimization criterion. The access-permission determination component 210 determines the combination of license entitlement types using the above discussed provisioning optimization technique.

The license provisioning system 105 includes a list generation component 215 that generates an output indicating the combination of license entitlement types. In some embodiments, the list generation component 215 generates the output as one or more lists such as the instance-based access list 125, user list 130 and user-based instance list 135. In some embodiments, the lists 125-135 can be used to procure the licenses for an application, e.g., from a computer server associated with a license vendor for the application.

The license provisioning system 105 includes an access-permission assignment component 220 that obtains access permissions (e.g., license entitlements), and/or assigns access permissions to the consumption demand requests. In some embodiments, the access-permission assignment component 220 obtains the license entitlements, e.g., from a computer server (not illustrated) associated with a license vendor for the application, based on the lists 125-135. In some embodiments, the access-permission assignment component 220 assigns the license entitlements based on the lists 125-135.

Figure 3:
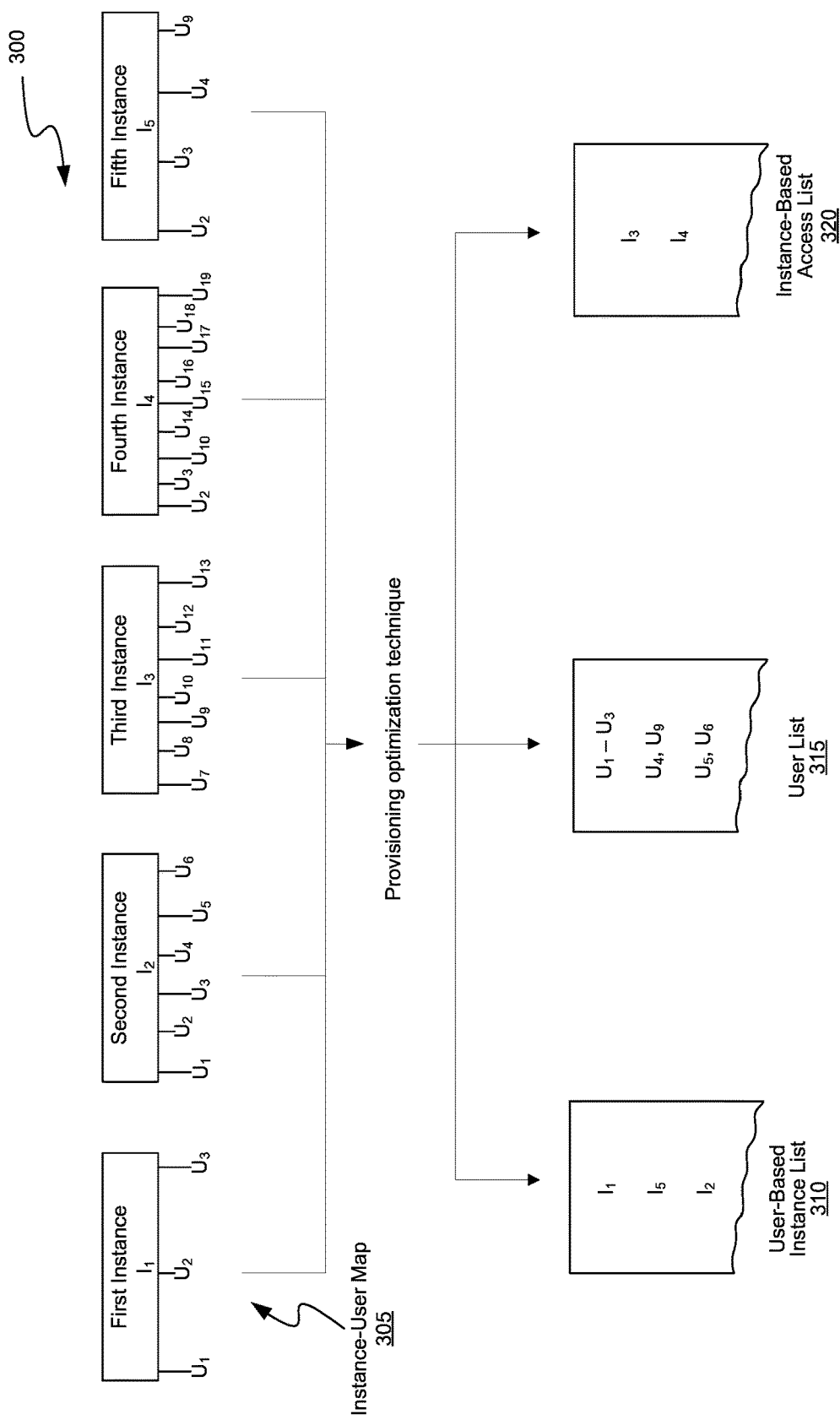
FIG. 3 is a block diagram of an example for generating a recommendation of license entitlement types based on an optimization criterion, consistent with various embodiments.

FIG. 3 is a block diagram of an example 300 for generating a recommendation of license entitlement types based on an optimization criterion, consistent with various embodiments. In some embodiments, the example 300 can be implemented in the environment 100 of FIG. 1 using the license provisioning system 105. In the example 300, the instance map 305 indicates that users $U_1$-$U_{19}$ are accessing instances $I_1$-$I_5$ of an application. In some embodiments, the instance map 305 is similar to the instance-user map 120. Further, consider that in the example 300, the optimization criterion is based on a unit cost of the license entitlement, and that an instance-based license entitlement costs five times that of a user-based license entitlement. That is, if the unit cost of a user-based license entitlement is "1" unit, then the unit cost of an instance-based license entitlement is "5" units. The provisioning optimization technique of the access-permission determination component 210 can use the above information as the input parameters and generate the lists 310-320. In some embodiments, the user-based instance list 310 is similar to the user-based instance list 135, the user list 315 is similar to the user list 130, and the instance-based access list 320 is similar to the instance-based access list 125.

The access-permission determination component 210 analyzes the instance map 305 using the following algorithm to generate the lists 310-320. The access-permission determination component 210 determines instances $I_1$-$I_5$ that satisfy a first portion of the optimization criterion, e.g., a total cost of licenses required to license all users of an instance using the user-based license entitlement being less than the total cost required to license the entire instance using the instance-based license entitlement. The access-permission determination component 210 identifies the instances $I_1$-$I_5$ that satisfy the first portion of the optimization criterion. Such identified instances are added to the user-based instance list 310, and all users of those instances are added to the user list 315. In the example 300, instance $I_1$ has three users $U_1$-$U_3$, and therefore the total cost for licensing three users using the user-based license entitlement, which is "3" units, is less than the total cost of licensing the instance using the instance-based license entitlement, which is "5" units. Accordingly, instance $I_1$ is added to the user-based instance list 310 and the three users $U_1$-$U_3$ are added to the user list 315.

Next, the access-permission determination component 210 identifies instances that satisfy the first portion of the optimization criterion for users that are not already in the user list 315. That is, among the remaining instances, e.g., instances that are not in the user-based instance list 310, the access-permission determination component 210 identifies each instance for which the total cost of licenses required to license all users of that instance that are not already on the user list 315 is less than the total cost required to license the entire instance using the instance-based license entitlement. Such identified instances are added to the user-based instance list 310, and the users of those instances who are not already on the user list 315 are added to the user list 315. In the example 300, instance $I_5$ has four users $U_2$-$U_4$ and $U_9$, out of which users $U_2$ and $U_3$ are already in the user list 315. Therefore, the total cost for licensing the remaining users, e.g., $U_4$ and $U_9$, using the user-based license entitlement is "2" units, which is less than the total cost of "5" units for licensing the instance using the instance-based license entitlement. Accordingly, instance $I_5$ is added to the user-based instance list 310 and the users $U_4$ and $U_9$ are added to the user list 315. Similarly, for instance $I_2$, which has six users $U_1$-$U_6$, out of which users $U_1$-$U_4$ are already in the user list 315, the total cost for licensing the two users, e.g., $U_5$ and $U_6$, using the user-based license entitlement is "2" units, which is less than the total cost of "5" units for licensing the instance using the instance-based license entitlement. Accordingly, instance $I_2$ is added to the user-based instance list 310 and the users $U_5$ and $U_6$ are added to the user list 315.

The foregoing identification of instances that satisfy the first portion of the optimization criterion are repeated until either the user-based instance list 310 contains all instances, or no more such instances can be identified.

Next, the access-permission determination component 210 identifies instances that satisfy a second portion of the optimization criterion for users that are not already in the user list 315. That is, among the remaining instances, e.g., instances that are not in the user-based instance list 310, the access-permission determination component 210 identifies each instance for which the total cost of licenses required to license all users of that instance that are not already on the user list 315 is greater than the total cost required to license the entire instance using the instance-based license entitlement. Such identified instances are added to the instance-based access list 320. In the example 300, instances $I_3$ and $I_4$ are the remaining instances. $I_3$ has seven users $U_7$-$U_{13}$, out of which user $U_9$ is already in the user list 315. Therefore, the total cost for licensing the remaining six users, e.g., $U_7$, $U_8$ and $U_{10}$-$U_{13}$, using the user-based license entitlement is "6" units, which is greater than the total cost of "5" units for licensing the instance $I_3$ using the instance-based license entitlement. Accordingly, instance $I_3$ is added to the instance-based access list 320. Similarly, for instance $I_4$, which has nine users, e.g., $U_2$, $U_3$, $U_{10}$, and $U_{14}$-$U_{19}$, out of which users $U_2$ and $U_3$ are already in the user list 315, the total cost for licensing the remaining seven users, e.g., $U_{10}$ and $U_{14}$-$U_{19}$, using the user-based license entitlement is "7" units, which is greater than the total cost of "5" units for licensing the instance $I_4$ using the instance-based license entitlement. Accordingly, instance $I_4$ is added to the instance-based access list 320.

The above identification of instances satisfying the second portion of the optimization criterion is repeated until either the user-based instance list 310 and the instance-based access list 320 combined together contain all the instances $I_1$-$I_5$, or no more such instances can be identified.

The access-permission determination component 210 can then add all remaining instances not in the instance-based access list 320 to the user-based instance list 310.

The list generation component 215 generates a recommendation based on one or more of the three lists 310-320. In some embodiments, the recommendation can indicate (a) a number of instances to be licensed using the instance-based license entitlement, which is determined based on the instance-based access list 320, and (b) a number of users to be licensed using the instance-based license entitlement and the users that are to be licensed using the user-based license entitlement, which is determined based on the user list 315. The license provisioning system 105 can then enable the access-permission assignment component 220 to procure the licenses, e.g., from a computer server (not illustrated) associated with a license vendor for the application, based on the recommendation. In some embodiments, the license provisioning system 105 can also use the lists 310-320 in assigning the license entitlements to the access requests from the user, which is described in further detail at least with reference to FIG. 6.

Note that an instance of the application can be hosted on a server, and that a server can host one or more instances. In some embodiments, the assignment of license entitlement is determined with respect to an instance and not with respect to a server that hosts the instance. For example, if a first server that hosts an instance that can be provisioned using the instance-based license entitlement becomes unavailable, e.g., the first server fails or crashes, the instance can be hosted on a second server and still be provisioned using the same instance-based license entitlement.

Figure 4:
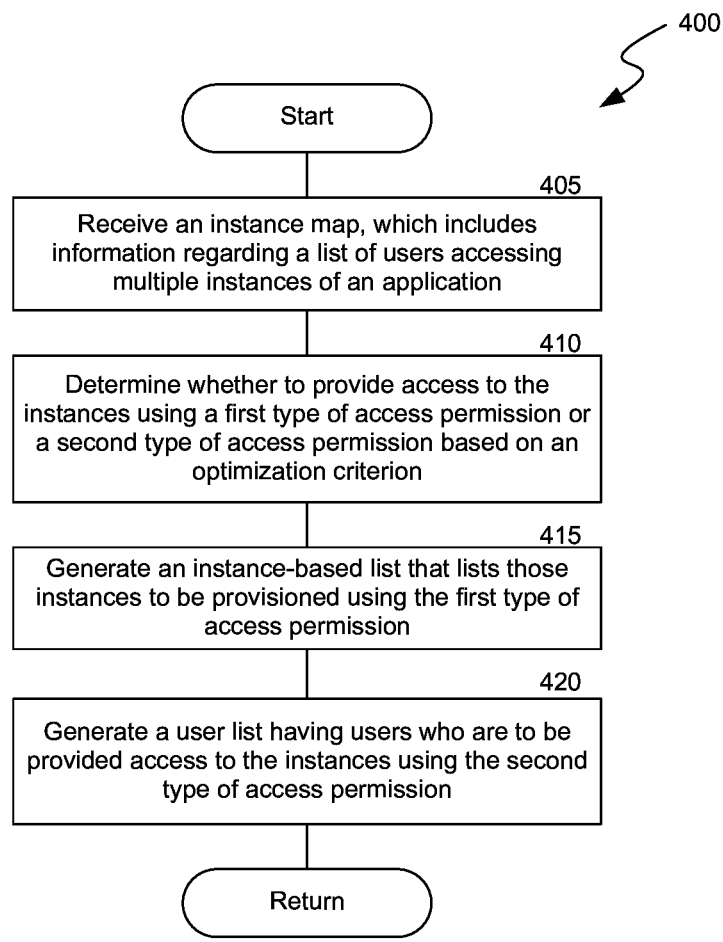
FIG. 4 is a flow diagram of a process of generating a license entitlement type recommendation based on an optimization criterion, consistent with various embodiments.

FIG. 4 is a flow diagram of a process 400 of generating a license entitlement type recommendation based on an optimization criterion, consistent with various embodiments. The process 400 may be executed in an environment 100 of FIG. 1. At block 405, the receiving component 205 receives an input parameter for generating the recommendation of license entitlement types to be assigned for accessing instances of an application. The input parameter can include one or more of an instance map, e.g., instance map 305, a number of users accessing the instances, a number of instances executing the in the distributed computing system, or optimization criterion for which the recommendation of license entitlement types are to be optimized, e.g., unit cost of a license entitlement type. The optimization criterion can be based on an attribute of the license entitlement type, e.g., unit cost of the license entitlement type.

At block 410, the access-permission determination component 210 determines whether to provide access to an instance using a first license entitlement type, e.g., instance-based license entitlement, or a second license entitlement type, e.g., user-based license entitlement, based on the optimization criterion.

At block 415, the list generation component 215 generates a list of instances which are to be provisioned using the first license entitlement type. For example, the first list of instances can be similar to the instance-based access list 320, which are to be provisioned using the instance-based license entitlement. In some embodiments, an instance provisioned using the instance-based license entitlement type can be accessed by any user. The first list can be used to generate a recommendation for a quantity of licenses of instance-based license entitlement to be procured by the license provisioning system 105 for serving the consumer demand requests while satisfying the optimization criterion.

At block 420, the list generation component 215 generates a second list of users who are to be provisioned access to the instances using the second license entitlement type. For example, the second list of users can be similar to the user list 315, which includes users who are to be provisioned access to the instances using the user-based license entitlement. In some embodiments, a user assigned with the user-based license entitlement can access any of the instances. The second list can be used to generate a recommendation for a quantity of licenses of user-based license entitlement to be procured by the license provisioning system 105 for serving the consumer demand requests while satisfying the optimization criterion. The recommendation can also include identification information those users. The license provisioning system 105 can then enable the access-permission assignment component 220 to procure the licenses, e.g., from a computer server (not illustrated) associated with a license vendor for the application, based on the recommendation. In some embodiments, the license provisioning system 105 can also use the lists 310-320 in assigning a license entitlement to the user in response to receiving an access request from the user, which is described in further detail at least with reference to FIG. 6.

Figure 5:
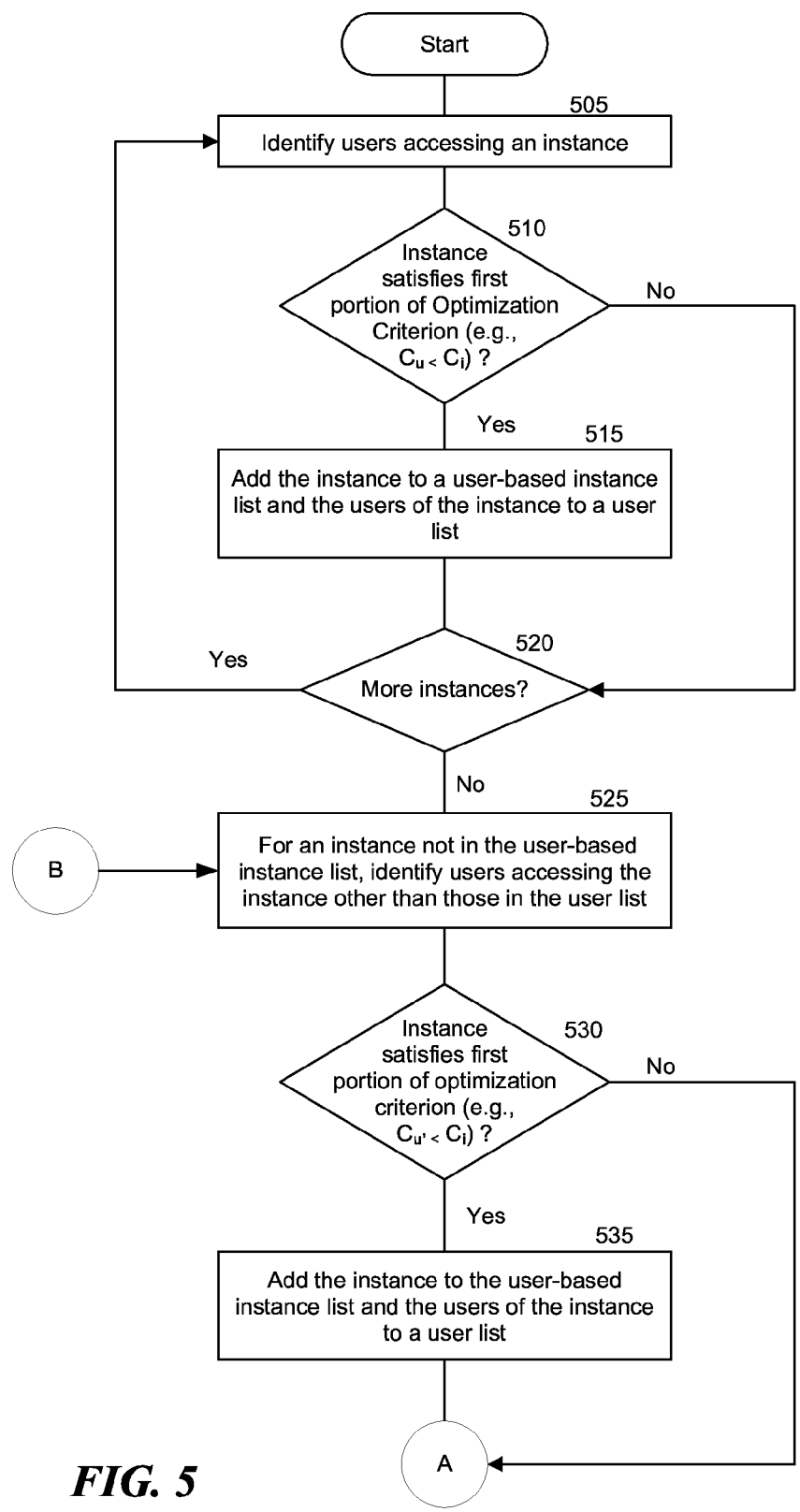
FIG. 5 is a flow diagram of a process for determining the license entitlement types to be procured and/or provisioned based on the optimization criterion, consistent with various embodiments.
Figure 5:
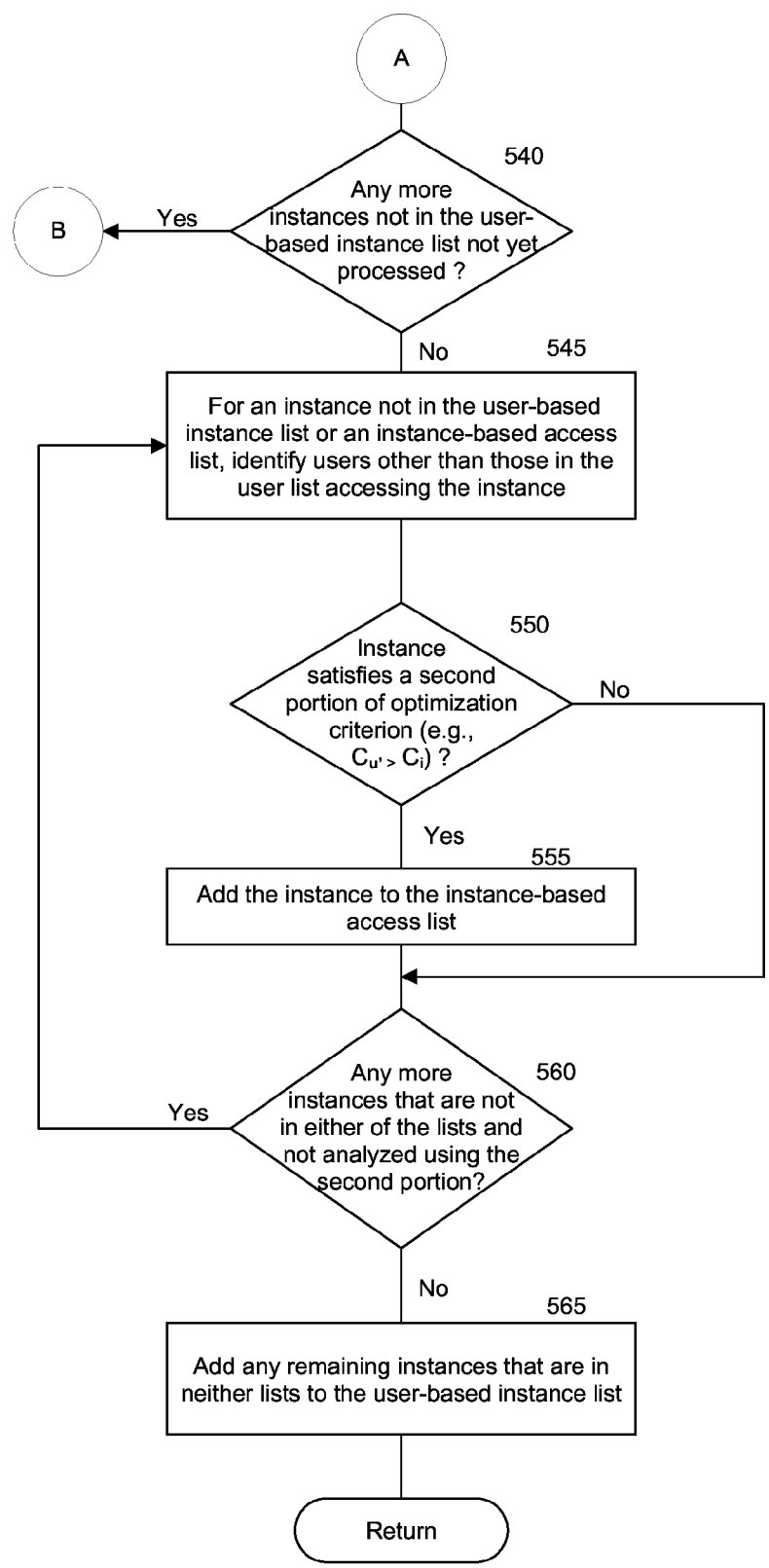

FIG. 5 is a flow diagram of a process 500 for determining the license entitlement types to be procured and/or provisioned based on the optimization criterion, consistent with various embodiments. The process 500 may be executed in the environment 100 of FIG. 1. In some embodiments, the process 500 can be executed as part of block 410 of FIG. 4. At block 505, the access-permission determination component 210 reads the instance map, e.g., instance map 305, to identify users accessing an instance of the application.

At determination block 510, the access-permission determination component 210 determines if the instance satisfies a first portion of the optimization criterion. In some embodiments, the optimization criterion is based on an attribute associated with a license entitlement type, e.g., unit cost of a license entitlement of the particular type. The first portion of the optimization can be that a total cost ("$C_u$") of licenses required to license all users of an instance using the user-based license entitlement is less than the total cost ("$C_i$") to license the entire instance using the instance-based license entitlement.

If the instance does not satisfy the first portion of the optimization criterion, the process 500 proceeds to determination block 520. On the other hand, if the instance satisfies the first portion of the optimization criterion, at block 515, the access-permission determination component 210 adds the instance to the user-based instance list 310 and all users of that instance to the user list 315. In the example 300, instance $I_1$ has three users $U_1$-$U_3$, and therefore the total cost for licensing three users using the user-based license entitlement, which is "3" units, is less than the total cost of licensing the instance using the instance-based license entitlement, which is "5" units. Accordingly, instance $I_1$ is added to the user-based instance list 310 and the three users $U_1$-$U_3$ are added to the user list 315.

At determination block 520, the access-permission determination component 210 determines if there are more instances in the distributed computing system. If there are more instances, the process 500 proceeds to block 505 to analyze the next instance. The process 500 repeats the execution of blocks 505-520 until all instances are analyzed with respect to the first portion of the optimization criterion. If all instances are analyzed, then the process proceeds to block 525.

At block 525, the access-permission determination component 210 identifies, for an instance that is not in the user-based instance list 310, users of that instance who are not already on the user list 315.

At determination block 530, the access-permission determination component 210 determines if the instance satisfies the first portion of the optimization criterion for those users of the instance who are not already on the user list 315. That is, the access-permission determination component 210 determines if the total cost ("$C_u$") of licenses in licensing all users of the instance who are not already on the user list 315 using the user-based license entitlement is less than the total cost ("$C_i$") of the license in licensing the entire instance using the instance-based license entitlement.

If the instance does not satisfy the first portion of the optimization criterion, the process 500 proceeds to determination block 540. On the other hand, if the instance satisfies the first portion of the optimization criterion, at block 535, the access-permission determination component 210 adds the instance to the user-based instance list 310 and the users of the instance who are not already on the user list 315 to the user list 315. In the example 300, instance $I_5$ has four users $U_2$-$U_4$ and $U_9$, out of which users $U_2$ and $U_3$ are already in the user list 315. Therefore, the total cost for licensing the remaining users, e.g., $U_4$ and $U_9$, using the user-based license entitlement is "2" units, which is less than the total cost of "5" units for licensing the instance using the instance-based license entitlement. Accordingly, instance $I_5$ is added to the user-based instance list 310 and the users $U_4$ and $U_9$ are added to the user list 315.

At determination block 540, the access-permission determination component 210 determines if there are more instances that are not in the user-based instance list 310 and that are not analyzed with respect to the first portion of the optimization criterion at determination block 530. If there are more of those instances, the process 500 proceeds to block 525 to analyze the next instance. The process 500 repeats the execution of blocks 525-540 until all those instances are analyzed with respect to the first portion of the optimization criterion. If all those instances are analyzed, then the process proceeds to block 545.

At block 545, the access-permission determination component 210 identifies, for an instance that is not in the user-based instance list 310 or an instance-based access list 320, users of the instance who are not already on the user list 315.

At determination block 550, the access-permission determination component 210 determines if the instance satisfies a second portion of the optimization criterion for those users of the instance who are not already on the user list 315. That is, the access-permission determination component 210 determines if the total cost ("$C_u$") of licenses required to license all users of the instance who are not already on the user list 315 using the user-based license entitlement is greater than the total cost ("$C_i$") to license the entire instance using the instance-based license entitlement. In some embodiments, the total cost ("$C_u$") is determined as a function of a fractional cost of providing the user-based license entitlement to each user of the instance who are not already on the user list 315 in which the fractional cost of a specified user is determined as a function of (a) cost of providing the user-based license entitlement to the specified user and (b) a number of instances accessed by the specified user that are not in the user-based instance list 310 or the instance-based access list 320. For example, the total cost ("$C_u$") can be the sum of each user's fractional cost, where each user's fractional cost is the user's full cost (cost of user-based license entitlement for the corresponding user) divided by the number of instances used by this user that are neither in the user-based instance list 310 nor the instance-based access list 320.

If the instance does not satisfy the second portion of the optimization criterion, the process 500 proceeds to determination block 560. On the other hand, if the instance satisfies the second portion of the optimization criterion, at block 555, the access-permission determination component 210 adds the instance to the instance-based access list 320. In the example 300, instances $I_3$ and $I_4$ are the remaining instances. $I_3$ has seven users $U_7$-$U_{13}$, out of which user $U_9$ is already in the user list 315. Therefore, the total cost for licensing the remaining six users, e.g., $U_7$, $U_8$ and $U_{10}$-$U_{13}$, using the user-based license entitlement is "6" units, which is greater than the total cost of "5" units for licensing the instance $I_3$ using the instance-based license entitlement. Accordingly, instance $I_3$ is added to the instance-based access list 320.

At determination block 560, the access-permission determination component 210 determines if there are any more instances that are not in the user-based instance list 310 or the instance-based access list 320. If there are more of those instances, the process 500 proceeds to block 545 to analyze the next instance. The process 500 repeats the execution of blocks 545-560 until all those instances are analyzed with respect to the second portion of the optimization criterion. If all those instances are analyzed, then the process proceeds to block 565.

At block 565, the access-permission determination component 210 adds all remaining instances that are not in the instance-based access list 320 to the user-based instance list 310.

Figure 6:
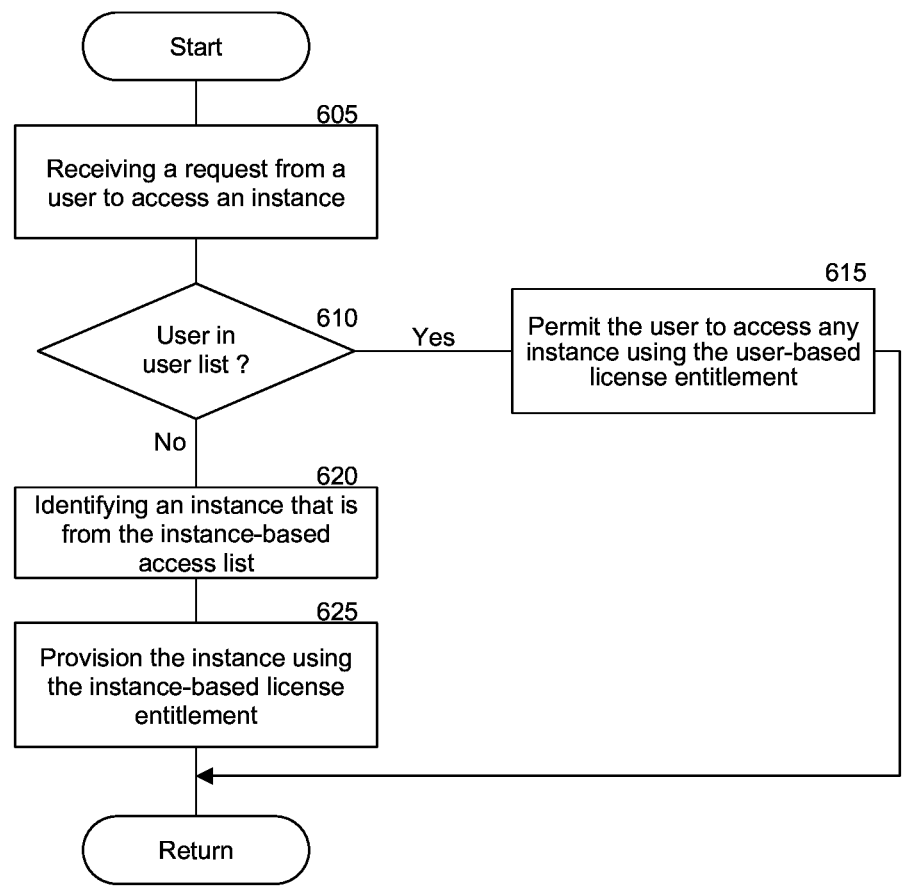
FIG. 6 is a flow diagram of a process for assigning a license entitlement to an access request from a user, consistent with various embodiments.

FIG. 6 is a flow diagram of a process 600 for assigning a license entitlement to an access request from a user, consistent with various embodiments. The process 600 may be executed in the environment 100 of FIG. 1. At block 605, the receiving component 205 receives an access request, e.g., access request 140, from a user, e.g., first user 117, for accessing one of the application instances 110 of the application.

At determination block 610, the access-permission determination component 210 determines whether the first user 117 is in the user list 130. That is, the access-permission determination component 210 determines if the first user 117 is assigned a user-based license entitlement. If the first user 117 is assigned a user-based license entitlement, at block 615, the access-permission assignment component 220 provisions any of the application instances 110 to the access request 140 from the first user 117. However, in some embodiments, it is typically more cost-effective, e.g., the total cost incurred in obtaining the licenses for satisfying the access requests is minimized, when the instances from the user-based instance list 135 are provisioned to users with user-based license entitlements. Since the instances from the instance-based access list 125 can be accessed by any user, e.g., even users without user-based license entitlement, it is more cost-effective to reserve those instances for provisioning to users without the user-based license entitlements. Accordingly, it may be more cost-effective to provision instances from the user-based instance list 135 to users with user-based license entitlements.

Referring back to determination block 610, if the first user 117 is not in the user list 130, at block 620, the access-permission determination component 210 identifies an instance from the instance-based access list 125.

At block 625, the access-permission assignment component 220 provisions the instance from the instance-based access list 125 to the access request 140.

Figure 7:
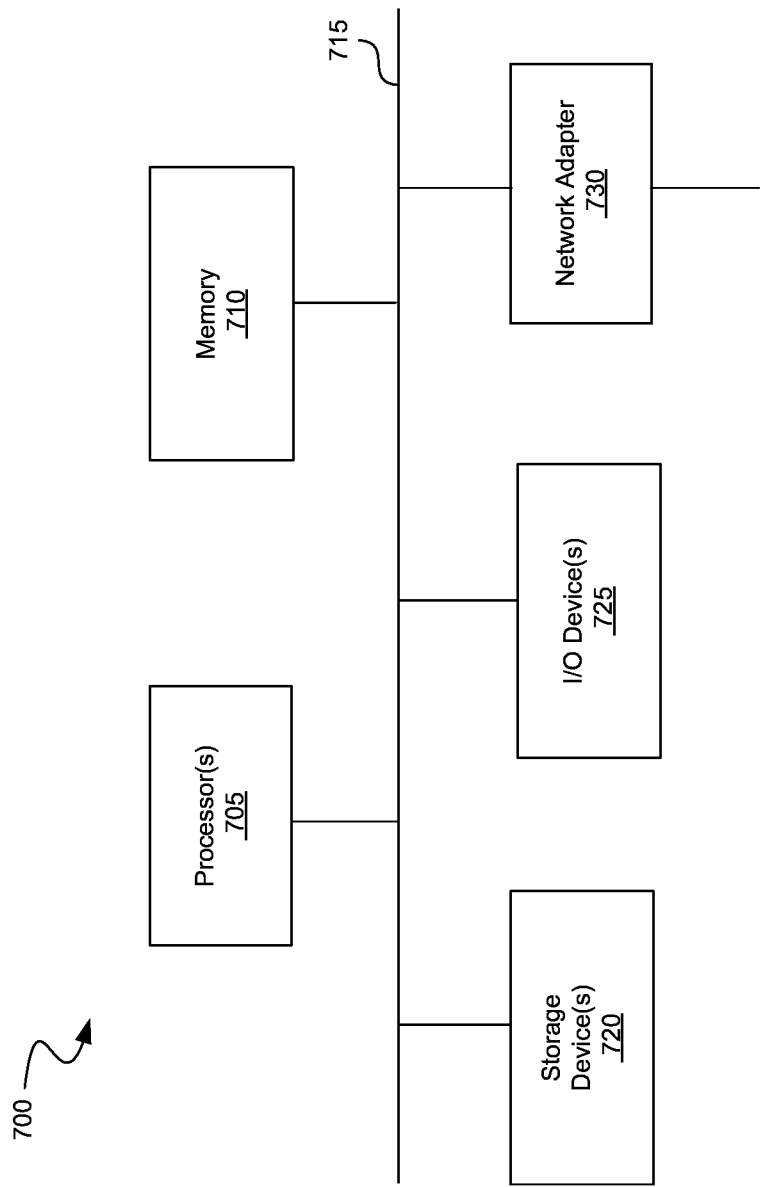
FIG. 7 is a block diagram of a computer system as may be used to implement features of the disclosed embodiments.

FIG. 7 is a block diagram of a computer system as may be used to implement features of the disclosed embodiments. The computing system 700 may be used to implement any of the entities, components, modules, systems, or services depicted in the examples of the foregoing figures (and any other entities described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A computer-implemented method, comprising:
   receiving a list of multiple instances of an application executing at multiple computer servers, wherein the instances are accessible by multiple users and using a first type of access permission or a second type of access permission, wherein the first type of access permission enables a specified instance of the instances to be accessed by any of the users, and wherein the second type of access permission enables a specified user of the users to access any of the instances;
   determining whether to provide access to the instances using the first type of access permission or the second type of access permission based on an optimization criterion, wherein the optimization criterion is a function of a cost associated with each of the types of access permission;
   generating an instance-based access list that includes those of the instances which are to be provisioned using the first type of access permission;
   generating a user-based instance list that includes those of the instances which are to be provisioned using the second type of access permission, wherein the generating the user-based instance list includes generating a user list that includes those of the users who are to be provided access to the instances using the second type of access permission;
   receiving a request from a first user of the users to access one of the multiple instances;
   in an event the first user is from the user list, provisioning any of the instances other than those from the instance-based access list; and
   in an event the first user is not from the user list, provisioning any of the instances from the instance-based access list.

2. The computer-implemented method of claim 1, wherein the determining includes:
   identifying a first instance of the instances for which a first cost and a second cost satisfy a first portion of the optimization criterion, the first cost being a total cost to be incurred in providing the second type of access permission to each user of a first set of the users who is accessing the first instance, the second cost being a cost to be incurred in provisioning the first instance to any of the users using the first type of access permission, and
   adding the first instance to the user-based instance list, and the first set of the users to the user list.

3. The computer-implemented method of claim 2, wherein the first portion of the optimization criterion includes the first cost being lesser than the second cost.

4. The computer-implemented method of claim 2 further comprising:
   identifying a second instance of the instances, which is distinct from the first instance, for which a third cost and a fourth cost satisfy the first portion of the optimization criterion, the third cost being a total cost to be incurred in providing the second type of access permission to a second set of the users accessing the second instance except who are already in the user list, the fourth cost being a cost to be incurred in provisioning the second instance to any of the users using the first type of access permission, and
   adding the second instance to the user-based instance list, and the second set of the users to the user list.

5. The computer-implemented method of claim 4, wherein the first portion of the optimization criterion includes the third cost being lesser than the fourth cost.

6. The computer-implemented method of claim 4 further comprising:
   identifying a third instance of the instances, which is distinct from instances of the user-based instance list, for which a fifth cost and a sixth cost satisfy a second portion of the optimization criterion, the fifth cost being a total cost to be incurred in providing the second type of access permission to a third set of the users accessing the third instance except who are already in the user list, the sixth cost being a cost to be incurred in provisioning the third instance to any of the users using the first type of access permission, and
   adding the third instance to the instance-based access list.

7. The computer-implemented method of claim 6, wherein the second portion of the optimization criterion includes the fifth cost being greater than the sixth cost.

8. The computer-implemented method of claim 6, wherein the total cost is determined as a function of a fractional cost of providing the second type of access permission to each user of the third set of users, wherein the fractional cost of a specified user of the third set of users is further determined as a function of (a) cost of providing the second type of access permission to the specified user and (b) a number of instances accessed by the specified user that are not in the user-based instance list or in the instance-based access list.

9. The computer-implemented method of claim 1, wherein the optimization criterion is configured to minimize a total cost associated with provisioning the first type of access permission and the second type of access permission to access requests from the multiple users for accessing the multiple instances.

10. The computer-implemented method of claim 1, wherein generating the instance-based access list further includes:
    provisioning instances from the instance-based access list to users other than those in the user list.

11. The computer-implemented method of claim 1, wherein generating the user list further includes:
    permitting users from the user list to access any of the instances other than those in the instance-based access list using the second type of access permission.

12. The computer-implemented method of claim 1, wherein provisioning any of the instances other than those from the instance-based access list includes:
    permitting the first user to access any of the instances other than those from the instance-based access list using the second type of access permission.

13. The computer-implemented method of claim 12, wherein provisioning any of the instances from the instance-based access list includes:
    identifying a first instance from the instance-based access list, and
    providing the first user access to the first instance using the first type of access permission.

14. A non-transitory computer-readable storage medium storing computer-readable instructions, comprising:
    instructions for determining whether to provide access to multiple instances of an application executing at multiple computer servers using a first type of access permission or a second type of access permission, wherein the first type of access permission permits a specified instance of the instances to be accessed by any of multiple entities, and wherein the second type of access permission permits a specified entity of the entities to access any of the instances, wherein the determination is made at least based on an attribute associated with each of the types of access permission;

instructions for generating an instance-based access list that includes those instances which are to be accessed by any of the entities using the first type of access permission;

instructions for generating an entity list that includes those entities that are to be provided access to the instances using the second type of access permission;

receiving a request from a first entity of the entities to access one of the multiple instances;

in an event the first entity is from the entity list, provisioning any of the instances other than those from the instance-based access list; and in an event the first entity is not from the entity list, provisioning any of the instances from the instance-based access list.

15. The non-transitory computer-readable storage medium of claim 14, wherein the instructions for determining include:

instructions for identifying a first instance of the instances for which a first attribute and a second attribute satisfy a first portion of an optimization criterion, the first attribute associated with providing the second type of access permission to at least some of the entities that are accessing the first instance, the second attribute associated with providing the first type of access permission to access the first instance by any of the entities, and instructions for adding the first instance to the instance-based access list.

16. The non-transitory computer-readable storage medium of claim 15, wherein the instructions for identifying the first instance include:

instructions for filtering out, from the instances, a second instance for which a third attribute and a fourth attribute satisfy a second portion of the optimization criterion, the third attribute associated with providing the second type of access permission to each entity of a first subset of the entities that are accessing the second instance, the fourth attribute associated with providing the first type of access permission to access the second instance by any of the entities, instructions for filtering out, from the instances, a third instance for which a fifth attribute and a sixth attribute satisfy the second portion of the optimization criterion, the fifth attribute associated with providing the second type of access permission to each of the entities that are not already in the first subset of the entities and that are accessing the third instance, the sixth attribute associated with providing the first type of access permission to access the third instance by any of the entities, and instructions for adding instances other than the second instance and the third instance and those that satisfy the first portion of the optimization criterion to the instance-based access list.

17. The non-transitory computer-readable storage medium of claim 16 further comprising:

instructions for adding the first instance and the second instance to a user-based instance list, wherein the user-based instance list includes those instances which are to be accessed by entities having the second type of access permission; and instructions for adding to the entity list:
the first subset of the entities, and
the each of the entities that are not already in the first subset of the entities and that are accessing the third instance.

18. The non-transitory computer-readable storage medium of claim 16, wherein the at least some of the entities that are accessing the first instance are entities that are not in the in the first subset of the entities.

19. The non-transitory computer-readable storage medium of claim 16, wherein the third attribute is a first cost to be incurred in providing the second type of access permission to each of the first subset of the entities that are accessing the second instance, and wherein the fourth attribute is a second cost to be incurred in providing the first type of access permission to access the second instance by any of the entities.

20. The non-transitory computer-readable storage medium of claim 19, wherein the second portion of the optimization criterion includes the first cost being lesser than the second cost.

21. The non-transitory computer-readable storage medium of claim 15, wherein the first attribute is a first cost to be incurred in providing the second type of access permission to at least some of the entities that are accessing the first instance, and wherein the second attribute is a second cost to be incurred in providing the first type of access permission to access the first instance by any of the entities.

22. The non-transitory computer-readable storage medium of claim 21, wherein the first portion of the optimization criterion includes the first cost being greater than the second cost.

23. A system, comprising:
a processor;
a memory;
a first component configured to receive a list of multiple instances of an application executing at multiple computer servers, wherein the instances are accessible by multiple entities and using a first type of access permission or a second type of access permission, wherein the first type of access permission permits a specified instance of the instances to be accessed by any of the entities, and wherein the second type of access permission permits a specified entity of the entities to access any of the instances;
a second component configured to determine whether to provide access to the instances using the first type of access permission or the second type of access permission based on a cost associated with each of the types of access permission; and
a third component configured to generate:
an instance-based access list that includes those instances which can be accessed by any of the entities using the first type of access permission, and
an entity list that includes those entities that are to be provided access to any of the instances using the second type of access permission,
wherein the second component is further configured to:
receive a request from a first entity of the entities to access one of the multiple instances,
in an event the first entity is from the entity list, provision any of the instances other than those from the instance-based access list, and
in an event the first entity is not from the entity list, provision any of the instances from the instance-based access list.

24. The system of claim 23, wherein the second component is configured to identify a first instance of the instances for which a first cost and a second cost satisfy a first portion of an optimization criterion, the first cost being a total cost to be incurred in providing the second type of access permission to each entity of a first subset of the entities that are accessing the first instance, the second cost being a cost to be incurred in providing the first type of access permission to access the first instance by any of the entities, and the third component is configured to add:

the first instance to a user-based instance list, wherein the user-based instance list includes those of the instances to be provisioned using the second type of access permission, and the first subset of the entities to the entity list.

25. The system of claim 24, wherein the first portion of the optimization criterion includes the first cost being lesser than the second cost.

26. The system of claim 24, wherein the second component is configured to identify a second instance of the instances, which is distinct from the first instance, for which a third cost and a fourth cost satisfy the first portion of the optimization criterion, the third cost being a total cost to be incurred in providing the second type of access permission to each of the entities that are not already in the entity list and that are accessing the second instance, the fourth cost being a cost to be incurred in providing the first type of access permission to access the second instance by any of the entities, and the third component is configured to add:

the second instance to the user-based instance list, and the each of the entities that are not already in the entity list and that are accessing the second instance to the entity list.

27. The system of claim 26, wherein the second component is further configured to identify a third instance of the instances, which is distinct from the user-based instance list, for which a fifth cost and a sixth cost satisfy a second portion of the optimization criterion, the fifth cost being a total cost to be incurred in providing the second type of access permission to each of the entities that are not already in the entity list and that are accessing the third instance, the sixth cost being a cost to be incurred in providing the first type of access permission to access the third instance by any of the entities, and the third component is configured to add the third instance to the instance-based access list.

28. The system of claim 27, wherein the second portion of the optimization criterion includes the fifth cost being greater than the sixth cost.

29. The system of claim 27, wherein the total cost is determined as a function of a fractional cost of providing the second type of access permission to each user of the third set of users, wherein the fractional cost of a specified user of the third set of users is further determined as a function of (a) cost of providing the second type of access permission to the specified user and (b) a number of instances accessed by the specified user that are not in the user-based instance list or in the instance-based access list.

30. The system of claim 26, wherein the first portion of the optimization criterion includes the third cost being lesser than the fourth cost.

\* \* \* \* \*